(12) United States Patent
Bala et al.

(10) Patent No.: US 7,352,491 B2
(45) Date of Patent: Apr. 1, 2008

(54) SYSTEM AND METHOD FOR SELECTING THE BEST SET OF DEVICES FOR RENDERING COLOR DOCUMENTS

(75) Inventors: Raja Bala, Webster, NY (US); Gaurav Sharma, Webster, NY (US); Robert J. Rolleston, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 920 days.

(21) Appl. No.: 10/641,205

(22) Filed: Aug. 14, 2003

(65) Prior Publication Data

US 2005/0036171 A1 Feb. 17, 2005

(51) Int. Cl.
    H04N 1/40 (2006.01)
(52) U.S. Cl. .................. 358/2.1; 358/504
(58) Field of Classification Search ............ 358/1.9, 358/2.1, 1.4, 1.15, 468, 500, 504, 502, 516, 358/518–523
    See application file for complete search history.

(56) References Cited

U.S. PATENT DOCUMENTS

| | | | |
|---|---|---|---|
| 5,416,890 A | 5/1995 | Beretta |
| 5,502,580 A | 3/1996 | Yoda et al. |
| 5,537,516 A | 7/1996 | Sherman et al. |
| 5,604,610 A | 2/1997 | Spaulding et al. |
| 5,611,030 A | 3/1997 | Stokes |

(Continued)

OTHER PUBLICATIONS

Pending U.S. Appl. No. 09/566,291, filed May 5, 2000, entitled On-Line Calibration System for a Dynamically Varying Color Marking Devic.

(Continued)

Primary Examiner—Thomas D. Lee
Assistant Examiner—Stephen Brinich

(57) ABSTRACT

The system for selecting a best device for rendering a color document involves first determining the types of color data included in the color document to be printed. Once the type of color data has been determined, the color characteristics are matched against the strengths of the available output devices to obtain a list of devices best suited for this particular color print job. At least one device from the list of best devices is selected and the color document is rendered onto the selected device. Preferably, the types of color data involved are determined by the mix of defined colorimetry and undefined colorimetry in the color document. Alternatively, the types of color data are determined by analyzing the colorspaces in the document (i.e., RGB, CMYK, LAB, XYZ, etc.), and the embedded profiles, if any, in the document (e.g., sRGB, SWOPCMYK, Euroscale). In the instance wherein a number of devices match the criteria for selection, only those devices which honor embedded color profiles are selected for documents containing embedded profiles. Alternatively, only those devices are selected that produce a consistent rendering across multiple color spaces and profiles for documents with a mix of color spaces and profiles. Selecting the best device may also depend on whether the type of print job is considered to be Job-Balancing or Job-Splitting. With Job-Balancing, at least one of the metrics is used: (i) Intersection Gamut Volume, (ii) Gamut Similarity, or (iii) Mismatch Between Document Colors and Intersection Gamut for device selection. With Job-Splitting, at least one of these metrics are used: (i) Individual Gamut Volume, or (ii) Mismatch Between Document Colors and Device Gamut. Colorimetric definition of the selected colors can be retrieved from either an embedded source profile or by default and mapping the colors to the output gamut.

34 Claims, 2 Drawing Sheets

U.S. PATENT DOCUMENTS

| | | | |
|---|---|---|---|
| 5,710,872 A | 1/1998 | Takahashi et al. | |
| 5,719,956 A | 2/1998 | Ogatsu et al. | |
| 5,731,818 A | 3/1998 | Wan et al. | |
| 5,739,927 A | 4/1998 | Balasubramanian et al. | |
| 5,748,858 A | 5/1998 | Ohtsuka et al. | |
| 5,764,387 A | 6/1998 | Yamada | |
| 5,872,898 A | 2/1999 | Mahy | |
| 5,881,211 A | 3/1999 | Matsumura | |
| 5,960,110 A | 9/1999 | Usami | |
| 5,987,167 A | 11/1999 | Inoue | |
| 6,043,909 A | 3/2000 | Holub | |
| 6,072,464 A | 6/2000 | Ozeki | |
| 6,151,135 A | 11/2000 | Tanaka et al. | |
| 6,157,469 A | 12/2000 | Mestha | |
| 6,157,735 A | 12/2000 | Holob | |
| 6,160,968 A | 12/2000 | Noda | 399/8 |
| 6,344,902 B1 | 2/2002 | Duke et al. | |
| 6,377,366 B1 | 4/2002 | Usami | |
| 6,396,595 B1 | 5/2002 | Shimazaki | |
| 6,628,822 B1 | 9/2003 | Nakabayashi et al. | |
| 6,636,628 B1 | 10/2003 | Wang | |
| 6,678,068 B1 * | 1/2004 | Richter et al. | 358/1.15 |
| 6,870,636 B2 | 3/2005 | Kulkarni | |
| 6,947,163 B2 * | 9/2005 | Takemura | 358/1.15 |
| 7,024,034 B2 | 4/2006 | Kim et al. | |
| 7,090,417 B2 * | 8/2006 | Roztocil et al. | 400/62 |
| 7,180,632 B2 | 2/2007 | Kanai et al. | |
| 7,193,746 B2 | 3/2007 | Kanai | |
| 7,199,900 B2 | 4/2007 | Ogatsu et al. | |
| 2003/0072016 A1 | 4/2003 | Dalrymple et al. | |
| 2004/0196475 A1 | 10/2004 | Zeng et al. | |

OTHER PUBLICATIONS

R. Balasubramanian, "Refinement of Printer Transformations Using Weighted Regression", SPIE vol. 2658, pp. 334-340 (1996).

Abbreviated Journal Title: "Jsuanji Xuebao", Maozu Guo, et al. Chinese Journal of Computers, vol. 23. No. 8, Aug. 2000, pp. 819-823.

"Sequential Linear Interpolation of Multi-Dimensional Functions", Allebach, et al., IEEE Trans on Image Processing, vol. 6, No. 9, Sep. 1997.

* cited by examiner

ID# 7,352,491 B2

SYSTEM AND METHOD FOR SELECTING THE BEST SET OF DEVICES FOR RENDERING COLOR DOCUMENTS

RELATED APPLICATIONS

Cross reference is made to the following copending application being filed concurrently: U.S. application Ser. No. 10/640,835, entitled "SYSTEM AND METHOD FOR OBTAINING COLOR CONSISTENCY FOR A COLOR PRINT JOB ACROSS MULTIPLE OUTPUT DEVICES", by Gaurav Sharma et al.; and U.S. application Ser. No. 10/465,457 filed Jun. 19, 2003, entitled "A METHOD FOR STANDARDIZING INPUT CMYK VALUES FOR CLUSTERED PRINTING ENVIRONMENTS", by Lalit K. Mestha, et al.

FIELD OF THE INVENTION

The present invention generally relates to the field of device selection for color rendering and, more particularly, to systems for selecting a best device or a best set of devices in order to ensure color consistency across a plurality of output devices.

BACKGROUND OF THE INVENTION

In digital color publishing applications it is often desirable to distribute the rendering of a job on multiple devices which may or may not be physically co-located. In this patent, the term "devices" generally refers both hardcopy devices (i.e. printers) and softcopy display devices. For example, in cluster printing a color job might be split among multiple co-located printers in order to meet deadlines, reduce cost, or optimize overall print shop capacity.

Distributed printing from a centralized repository close to the final site of delivery is another scenario where rendering is split among multiple printers; which are not physically co-located. It will often be crucial that color reproduction amongst separate devices be highly consistent as color characteristics vary widely across devices and device controllers. Proper color management is thus needed to ensure color consistency.

One approach is to associate color correction (e.g., ICC) profiles with each output device. The profiles are derived independently for each device and loaded statically into the job management system. The colors of the input job are mapped to a device-independent color space (e.g., CIELAB) and color-corrected to the output device's profile prior to rendering. Such an approach can be found in U.S. Pat. Nos. 6,043,909 and 6,157,735 wherein a system for controlling and distributing color in a networked environment is disclosed. Both teach the concept of a "Virtual Proof", an abstract data structure that contains and manages the color profiles for each device in the system as well as the associated color-correction transformations to be applied to the input job. Although the use of device-independent color specification and profiles for color rendition on an output device is an improvement in the arts for device specific representation, this does not guarantee consistent color reproduction in certain applications involving multiple output devices.

Another problem arises from the fact that different output devices have different color gamuts. The gamut of an output device is defined as the region of colors in a device independent color space that can be reproduced on that device. In addition, the effective color gamut of a printer is often dependent on the various choices of image path elements such as ink-limit, gray component replacement (GCR), and halftones in instances where printers with different sets of image path elements represent different output devices. Standard color management approaches can only guarantee consistent color reproduction for colors in the job that are already within a color gamut common to all the output devices. The common gamut is the intersection of the individual device gamuts computed in a device independent color space. It is common for jobs to contain colors outside this common gamut. For example, consider a business graphic containing the primary colors of a display to be reproduced on multiple printers. Typically these colors are outside the gamut of all the printers and the application of independent color correction transforms does not guarantee consistent output among the devices. Differences can also be seen in saturated colors in pictorial images.

One potential solution to the problem of color consistency across multiple devices is to define a universal consistent color mode for all devices that ensures consistency across the different devices. For example, a universal consistent color mode may be achieved by restricting the colors for all output devices to the common gamut of the universe of devices employed. In order to be more useful, temporal variations among devices and differences across devices should be comprehended in computing the common gamut. Color critical jobs may then be rendered using the consistent mode to ensure that some inter-device differences do not unduly affect the color rendering of the job. This approach however has several limitations. One is that the restriction to the common gamut over time and across devices often exacts an unnecessary penalty in image quality. Even for a single device family, a significant region of the dynamic range may need to be sacrificed in order to achieve consistency over the fleet and over time. In addition, this does not scale well as new devices are introduced or older devices are removed. The introduction of a new device or removal of an existing device often requires an upgrade of the "consistent-mode" correction at all existing devices. Lastly, upon re-calibration and re-characterization of a device, each existing device should be updated.

BRIEF SUMMARY

The system and method for selecting a best device or a best set of devices for rendering a color document involves first determining the types of color data included in the color document to be printed. Once the type of color data has been determined, the color characteristics are matched against the strengths of the available output devices to obtain a list of devices best suited for this particular color print job. At least one device from the list of best devices is selected and the color document is rendered onto the selected device. Preferably, the types of color data involved are determined by the mix of defined colorimetry and undefined colorimetry in the color document. Alternatively, the types of color data are determined by analyzing the colorspaces in the document (i.e., RGB, CMYK, LAB, XYZ, etc.), and the embedded profiles, if any, in the document (e.g., sRGB, SWOPCMYK, Euroscale). In the instance wherein a number of devices match the criteria for selection, only those devices which honor embedded color profiles are selected for documents containing embedded profiles. Alternatively, only those devices are selected that produce a consistent rendering across multiple color spaces and profiles for documents with a mix of color spaces and profiles. Selecting the best device may also depend on whether the type of print job is considered to be Job-Balancing or Job-Splitting. With Job-Balancing, at least one of the metrics is used: (i) Intersection Gamut Volume, (ii) Gamut Similarity, or (iii) Mismatch Between Document Colors and Intersection Gamut for device selection. With Job-Splitting, at least one of these metrics are used: (i) Individual Gamut Volume, or (ii) Mismatch Between Document Colors and Device Gamut. Colorimetric definition of the selected colors can be retrieved from either an embedded source profile or by default and mapping the colors to the output gamut.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DESCRIPTION OF THE INVENTION

The present invention utilizes color characteristics from the set of targeted output printing devices to modify input color jobs such that color consistency is provided throughout and maximal image quality achieved across a set of output devices.

The method involves identifying a group of devices to which a job could potentially be rendered; obtaining color characteristics from devices in the identified group; selecting an optimum set of devices from this group; modifying the job based on the obtained color characteristics; and rendering the job on one or more of the devices within the optimum set. Device controllers associated with each of the output devices are queried to obtain color characteristics specific to the associated output device. The device may comprise the raw device alone or the combination of the raw device and the controller or front-end that drives the device. The optimum set of devices for a given job is obtained by examining, for example, similarity between image and device gamuts, similarity among device gamuts, or gamut volumes. The color gamut of each device is obtained from a device characterization profile either by retrieving the gamut tag or by derivation using the characterization data in the profile. The color gamut of each device is computed with knowledge of the transforms that relate device independent color to device dependent color using a combination of device calibration and characterization information. Modifications to the job are computed by a transform determined by using the color characteristics of the output devices along with the content of the job itself. The method further comprises mapping colors in the original job to the output devices' common gamut, i.e., intersection of the gamuts of the individual printers. The intersection gamut is derived from the individual color gamuts of the devices. The optimal technique generally depends on the characteristics of the input job and the user's rendering intent. Final color correction employs a standard colorimetric transform for each output device that does not involve any gamut mapping.

Figure 1:
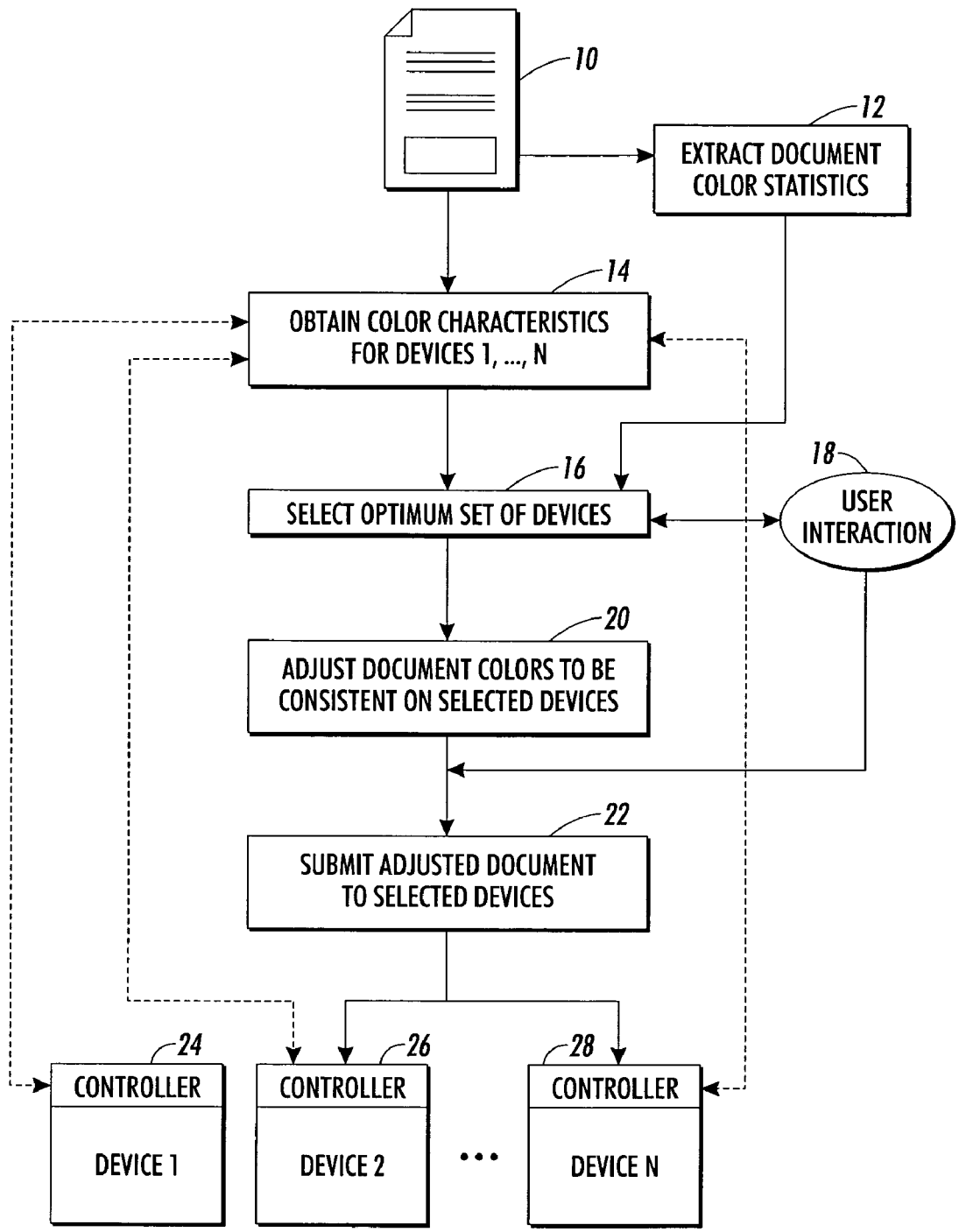
FIG. 1 is a flow diagram for selecting optimum set of devices for rendering a particular job based on job and device color characteristics wherein there are N devices in the system and devices 2, . . . , N are selected for rendering the particular document.

Attention is now directed to FIG. 1 which illustrates the application of the present invention to the process for selecting an optimum set of devices for rendering a specific job based on the color characteristics of the devices and the color statistics of the job document. The color characteristics of the output devices can be obtained 14. These characteristics at 14 may be, in part, provided by the individual controllers, at 24, 26, and 28, in preferably bi-directional communication therewith. From the input job document 10 the color statistics thereof may also be extracted at 12. The optimal set of output devices for rendering the input document may be selected 16 using the color characteristics of the output devices obtained at 14. Where the color statistics of the input job document and the color characteristics of the output devices are obtainable both 12 and 14 respectively determine the optimum set of devices for rendering the document 16. The selection of the optimal set of output devices 16 may utilize computations of color gamut similarity and overlap metrics and may additionally incorporate user input 18. At 20, the input job document is adjusted for consistency over the set of selected optimal devices. The user is preferably allowed additional control over the selection of the eventual output devices after the document has been adjusted for consistency at 20 and presented to the user. At this step, note that device 24 has been omitted from the set of optimal output devices. The set of output devices being reduced to devices 26 and 28 as shown. Devices 26 and 28 also provide input into the document color adjustment 20. At 22, the document is directed to the selected devices.

Figure 2:
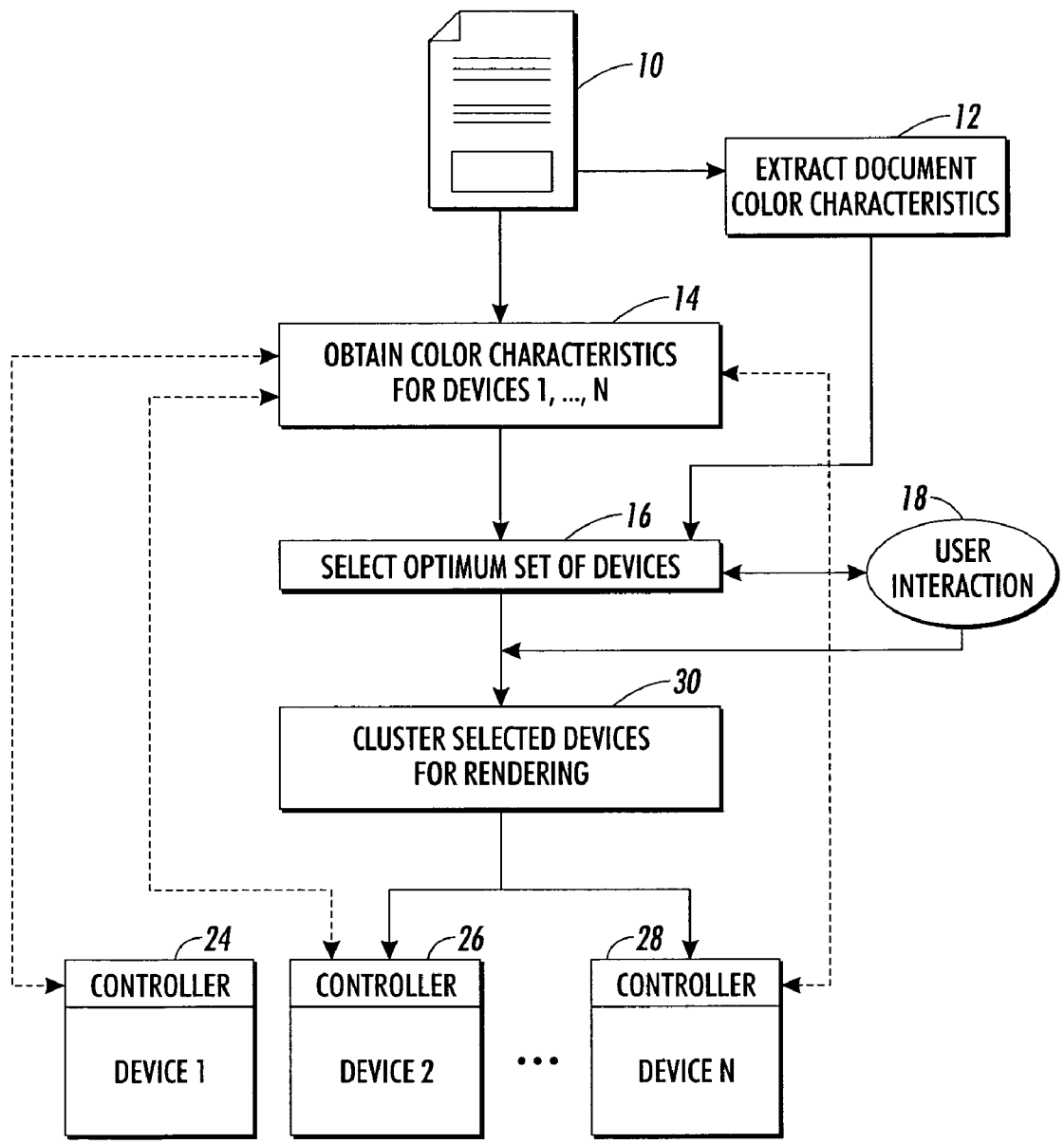
FIG. 2 is a flow diagram for selecting optimum set of devices for clustering based on their color characteristics wherein there are N devices in the system, and devices 2, . . . , N are selected for clustering based on similarity of color characteristics.

Attention is now directed to FIG. 2 which illustrates the application of the present invention to the process for selecting an optimum set of output devices for clustering based on their respective device color characteristics. As in FIG. 1, from the input job document 10 the color statistics thereof can be extracted at 12 and the optimal set of output devices selected directly therefrom at 16. From the input job document 10 the color characteristics of the output devices can be obtained at 14 and the optimal set of output devices selected directly therefrom at 16. The selection at 16 in FIG. 2 is based, in part, provided by the individual controllers, at 24, 26, and 28, in preferably bi-directional communication therewith. Where the color statistics of the input job document and the color characteristics of the output devices are both obtainable, at 12 and 14 respectively, these are combined to determine the optimum set of devices at 16 for rendering the input job document 10. Note that at 16 in FIG. 2, the set of output devices is bases on the similarities of the color characteristics of the devices. At 30, the set out output devices selected are clustered for rendering and the print job is sent to clustered devices 26 and 28. In addition, user input 18 can also be used in the selection of the optimal set of output device. At 20, the input job document is adjusted Advantageously, the present invention applies color adjustments dynamically; utilizing color characteristics of the particular set of target devices of interest rather than employing a universal set of output devices. The combined characteristics of the set of target output devices is used to determine the color correction and does not involve the compromises of a universal consistent-mode. It is advantageous that the functions involving interpretation of incompletely defined color input and the reduction of the colors in the image to a common gamut as disclosed herein are centralized thus minimizing variations due to differing interpretations and to differing adjustments for preference.

Another advantage is that the color characteristics of the input job can be analyzed in order to select only those devices whose color capabilities are best suited for rendering that particular job. The color attributes of the job are compared against the color attributes of the individual output devices currently available for this particular job to determine a best device or best set of devices for that job. In order to select the best device or best set of devices, the types of data included in the job need to be first determined by an analysis of the mix of defined colorimetry and undefined colorimetry, the colorspaces in the job (i.e., RGB, CMYK, LAB, XYZ, etc.), and the embedded profiles, if any, in the job (e.g., sRGB, SWOPCMYK, Euroscale). Once the type of color data has been determined, these are matched against output devices to determine potential devices best suited for this particular job. A number of devices may match the criteria for selection because devices whose default assumptions are widely preferred are better suited for a job with undefined colorimetry; devices which honor embedded color profiles are preferable for a job containing embedded profiles; and devices that produce a consistent rendering across multiple color spaces and profiles are preferred for job with a mix of color spaces and profiles. Selecting the best device depends on whether the type of job is considered to be Job-Balancing or Job-Splitting.

With Job-Balancing, the entire job is to be rendered individually on multiple output devices generally to increase throughput. As will be described herein, metrics that are relevant for this scenario are: (i) Intersection Gamut Volume, (ii) Gamut Similarity, and (iii) Mismatch Between Job Colors and Intersection Gamut.

With Job-Splitting, different pages from a job are to be rendered on different devices. Since all copies of a given page are rendered on a single device, the concern of color consistency across devices is not necessarily as pertinent as determining the output device that is most suitable for rendering which pages. Metrics that apply in this scenario are (I) Individual Gamut Volume, and (ii) Mismatch Between Job Colors and Device Gamut. Intersection Gamut is not as critical since the same content is not being rendered on multiple devices.

Gamut Volume

A good indicator of the color capability of a particular output device is the volume of its gamut. As previously mentioned, color gamut can be obtained from an ICC profile either by directly retrieving the gamut tag or by derivation using the characterization data in the A to B0 tag. For a set of devices $D_1, \ldots, D_n$ having associated color gamuts $G_1, \ldots, G_n$, and $V_i$ is denoted to be the volume of $G_i$, then for typical gamuts a calculation of gamut volume can be performed by:

a) describing a surface of a gamut with a series of triangles;

b) selecting a central point P within the gamut, e.g., LAB=[50,0,0] for each surface triangle:

c) defining a tetrahedron whose vertices include P and the vertices of the triangle;

d) computing a volume of the tetrahedron; and e) summing all tetrahedron volumes to obtain the gamut volume.

It is intended herein that alternate techniques known in the arts for computation of gamut volume, to the extent used in the present invention, be considered within the scope hereof. Further, the scope of the present invention also covers those situations where the gamut possesses an unusual shape.

Intersection Gamut Volume

A good metric for evaluating the combined capability of output devices is the volume of the intersection gamut. The intersection of two gamuts $G_i$ and $G_j$ is given by $G_{ij}=G_i \cap G_j$ where $V_{ij}$ is the volume of $G_{ij}$.

Gamut Similarity

Gamut Similarity provides a good indication of the compromises to achieve consistency across devices. The larger the value, the greater the similarity and hence the lesser the compromise. The similarity between two gamuts, is given by:

$$S_{ij} = \frac{V_{ij}}{\max(V_i, V_j)}$$

where $S_{ij}$ lies in the range [0, 1], with 0 corresponding to no gamut overlap, and 1 corresponding to identical gamuts. Since the denominator is the maximum of the individual gamut volumes, this provides a worst-case indicator of gamut similarity. This can also be extended to the case of more than two gamuts thus providing a single similarity metric for an arbitrary number of devices.

Mismatch Between Job Colors and Device Gamut

The average or maximum $\Delta E$ between colors in the input job and achievable colors with in the device gamut can serve as an indicator of mismatch between job and device. This involves first computing a $\Delta E$ metric (e.g., $\Delta E_{94}$) between input and gamut-mapped colors. Colors in the job that are likely to lie outside an output device's color gamut (e.g., dark and/or high-chroma colors) are identified. If the job is a raster then a histogram analysis can be used to select those dark and high-chroma colors with a significant frequency of occurrence. If the job is in a vector representation, information about color and frequency of occurrence may be more directly available.

Alternatively, the job could be presented in a Graphical User Interface enabling the user to select important colors. The calorimetric definition of the selected colors is retrieved from either an embedded source profile or by default and the colors are mapped to the output gamut. This is either the individual gamut of a device or the intersection gamut of a collection of devices. In one embodiment, gamut mapping clips out-of-gamut colors to the nearest color on the gamut surface while leaving in-gamut colors unaltered. It is intended herein that many methods of gamut mapping known in the arts fall within the scope of the present invention.

While the present invention has been described with reference being made specifically to color devices, it is also applicable to black and white devices.

Finally, while the preferred embodiment envisions a system employing a plurality of varying printing devices, it is envisioned herein that this invention also finds its uses in softcopy display devices which utilize soft-proofing methods to make color decisions and to those systems where the job is available to the end user in both hardcopy and softcopy forms and color consistency is required between the softcopy and hardcopy renditions.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for selecting the best device or best set of devices for the rendering of a color document, comprising:
   determining the types of color data included in the color document to be printed by determining a mix of defined colorimetry and undefined colorimetry in the color document and by analyzing colorspaces and embedded profiles in the document;
   once the type of color data has been determined, matching the color characteristics against the strengths of the available output devices to obtain a list of devices best suited for this particular color print job;
   selecting at least one device from the list of best devices; and
   rendering the color document onto the selected device.

2. A method as defined in claim 1 in the instance wherein a number of devices match the criteria for selection, selecting only devices which honor embedded color profiles for documents containing embedded profiles.

3. A method as defined in claim 1 in the instance wherein a number of devices match the criteria for selection, selecting only devices that produce a consistent rendering across multiple color spaces and profiles for documents with a mix of color spaces and profiles.

4. A method as defined in claim 1 wherein said selecting the best device depends on whether the type of print job is considered to be Job-Balancing or Job-Splitting.

5. A method as defined in claim 1 wherein determining the strengths of the available output devices comprises computing gamut volume; the volume calculation involving:
   describing a surface of a gamut with a series of triangles;
   selecting a central point P within the gamut, e.g., LAB=[50,0,0] for each surface triangle;
   defining a tetrahedron whose vertices include P and the vertices of the triangle;
   computing a volume of the tetrahedron; and
   summing all tetrahedron volumes to obtain the gamut volume.

6. A method as defined in claim 4, with Job-Balancing, utilizing at least one of the metrics (i) Intersection Gamut Volume, (ii) Gamut Similarity, or (iii) Mismatch Between Document Colors and Intersection Gamut for device selection.

7. A method as defined in claim 4, with Job-Splitting, utilizing at least one of (i) Individual Gamut Volume, or (ii) Mismatch Between Document Colors and Device Gamut.

8. A method as defined in claim 6 wherein the volume $V_{ij}$ of the intersection gamut involves gamuts $G_i$ and $G_j$ as given by $G_{ij}=G_i \cap G_j$ and $V_{ij}$ is the volume of $G_{ij}$.

9. A method as defined in claim 6 wherein the similarity between gamuts, is given by:

$$S_{ij} = \frac{V_{ij}}{\max(V_i, V_j)}$$

where $V_i$ and $V_j$ are the volumes of gamuts $G_i$ and $G_j$, $V_{ij}$ is the volume of the intersection gamut $G_{ij}$, $S_{ij}$ lies in the range [0, 1], with 0 corresponding to no gamut overlap, and 1 corresponding to identical gamuts such that the larger the value the greater the similarity and the lesser the compromise.

10. A method as defined in claim 6 wherein the mismatch between document colors and device gamut involves first computing an error metric (e.g., $\Box E_{94}$) between input and gamut-mapped colors for a selected set of document colors.

11. A method as defined in claim 10 wherein the selected set of document colors comprises those colors in the input document that are likely to lie outside an output device's color gamut (e.g., dark and/or high-chroma colors), and occur with significant frequency within the document.

12. A method as defined in claim 10 further comprising retrieving colorimetric definition of the selected colors from either an embedded source profile or by default and mapping the colors to the output gamut.

13. A method as defined in claim 10 further comprising parsing an input file to determine representative colors and storing that information within a job ticket for subsequent processing by a rendering service.

14. A method as defined in claim 1 further comprising pre-storing any dynamic color transformations to be applied to the document as an ICC profile provided that these depend only on the output devices and not on the characteristics of a given input document.

15. A system for selecting the best device or best set of devices for the rendering of a color document, comprising:
   a processor; and
   software and hardware resources sufficient to perform the tasks of:
   determining the types of color data included in the color document to be printed by determining a mix of defined colorimetry and undefined colorimetry in the color document and by analyzing colorspaces and embedded profiles in the document;
   once the type of color data has been determined, matching the color characteristics against the strengths of the available output devices to obtain a list of devices best suited for this particular color print job;
   selecting at least one device from the list of best devices; and
   rendering the color document onto the selected device.

16. A system as in claim 15 in the instance wherein a number of devices match the criteria for selection, selecting only devices which honor embedded color profiles for documents containing embedded profiles.

17. A system as in claim 15 in the instance wherein a number of devices match the criteria for selection, selecting only devices that produce a consistent rendering across multiple color spaces and profiles for documents with a mix of color spaces and profiles.

18. A system as in claim 15 wherein said selecting the best device depends on whether the type of print job is considered to be Job-Balancing or Job-Splitting.

19. A system as in claim 15 further comprising retrieving colorimetric definition of the selected colors from either an embedded source profile or by default and mapping the colors to the output gamut.

20. A system as in claim 15 further comprising parsing an input file to determine representative colors and storing that information within a job ticket for subsequent processing by a rendering service.

21. A system as in claim 15 further comprising pre-storing any dynamic color transformations to be applied to the document as an ICC profile provided that these depend only on the output devices and not on the characteristics of a given input document.

22. A system for selecting the best device or best set of devices for the rendering of a color document, comprising:
   a processor;

said processor determining the types of color data included in the color document to be printed by determining a mix of defined colorimetry and undefined colorimetry in the color document and by analyzing colorspaces and embedded profiles in the document;

said processor, once the type of color data has been determined, matching the color characteristics against the strengths of the available output devices to obtain a list of devices best suited for this particular color print job;

said processor selecting at least one device from the list of best devices; and said processor rendering the color document onto the selected device.

23. A system as in claim 22, wherein said processor, in the instance a number of devices match the criteria for selection, selects only devices which honor embedded color profiles for documents containing embedded profiles.

24. A system as in claim 22, wherein said processor, in the instance a number of devices match the criteria for selection, selects only devices that produce a consistent rendering across multiple color spaces and profiles for documents with a mix of color spaces and profiles.

25. A system as in claim 22, wherein said processor selects the best device depends on whether the type of print job is considered to be Job-Balancing or Job-Splitting.

26. A system as in claim 22, wherein said processor retrieves colorimetric definition of the selected colors from either an embedded source profile or by default and mapping the colors to the output gamut.

27. A system as in claim 22, wherein said processor parses an input file to determine representative colors and storing that information within a job ticket for subsequent processing by a rendering service.

28. A system as in claim 22, wherein said processor pre-stores any dynamic color transformations to be applied to the document as an ICC profile provided that these depend only on the output devices and not on the characteristics of a given input document.

29. A method for selecting an optimum set of devices for clustering in a print services, comprising the steps of:

determining the color rendition capabilities of available devices, the color rendition capabilities including a geometrical description of color gamut in a color space;

computing measures of similarity between the color rendition capabilities of said available devices; and selecting a plurality of devices for clustering based on said computed measures of similarity.

30. A method as defined in claim 29, wherein said measures of similarity are based on gamut descriptions.

31. A method as defined in claim 30 wherein computation of said measure of similarity is based on volumes of individual device gamut and the intersection gamut of candidate devices.

32. A method as defined in claim 31 wherein volume of gamut calculation involves:

describing a surface of a gamut with a series of triangles;

selecting a central point P within the gamut, e.g., LAB= [50,0,0] for each surface triangle;

defining a tetrahedron whose vertices include P and the vertices of the triangle;

computing a volume of the tetrahedron; and summing all tetrahedron volumes to obtain the gamut volume.

33. A method as defined in claim 31 wherein the volume of the intersection gamut involves $G_i$ and $G_j$ as given by $G_{ij}=G_i \cap G_j$ where $V_{ij}$ is the volume of $G_{ij}$.

34. A method as defined in claim 31 wherein the similarity between gamuts, is given by:

$$S_{ij} = \frac{V_{ij}}{\max(V_i, V_j)}$$

where $V_i$ and $V_j$ are the volumes of gamuts $G_i$ and $G_j$, $V_{ij}$ is the volume of the intersection gamut $G_{ij}$, $S_{ij}$ lies in the range [0, 1], with 0 corresponding to no gamut overlap, and 1 corresponding to identical gamuts such that the larger the value the greater the similarity and the lesser the compromise.

* * * * *